US008672131B2

(12) United States Patent
Nogueira et al.

(10) Patent No.: US 8,672,131 B2
(45) Date of Patent: Mar. 18, 2014

(54) INTERCHANGEABLE PACKING APPARATUS FOR AEROGENERATOR BLADES

(75) Inventors: Fabio Farani Nogueira, Sorocaba (BR); Bernard Rossire, Sorocaba (BR)

(73) Assignee: Tecsis Tecnologia e Sistemas Avançados S.A., Sorocaba (BR)

( * ) Notice: Subject to any disclaimer, the term of this patent is extended or adjusted under 35 U.S.C. 154(b) by 170 days.

(21) Appl. No.: 13/266,052

(22) PCT Filed: Apr. 27, 2009

(86) PCT No.: PCT/IB2009/051717
§ 371 (c)(1),
(2), (4) Date: Oct. 24, 2011

(87) PCT Pub. No.: WO2010/125424
PCT Pub. Date: Nov. 4, 2010

(65) Prior Publication Data
US 2012/0043250 A1    Feb. 23, 2012

(51) Int. Cl.
*B65D 85/30*    (2006.01)
(52) U.S. Cl.
USPC .............................................. 206/521; 410/44
(58) Field of Classification Search
USPC ......... 206/521, 523, 591, 594, 527, 443, 525; 410/44
See application file for complete search history.

(56) References Cited

U.S. PATENT DOCUMENTS

| | | |
|---|---|---|
| 2,851,235 A | 9/1958 | Henig |
| 4,341,494 A | 7/1982 | Fedele |
| 4,365,919 A | 12/1982 | Mehki |
| 5,271,499 A | 12/1993 | Van Horssen |
| 5,628,403 A | 5/1997 | Thomas et al. |
| 6,983,844 B2 | 1/2006 | O'Kane et al. |
| 7,690,875 B2 | 4/2010 | Grabau |

(Continued)

FOREIGN PATENT DOCUMENTS

| | | |
|---|---|---|
| EP | 1 813 473 A2 | 8/2007 |
| EP | 1 849 719 A1 | 10/2007 |

(Continued)

OTHER PUBLICATIONS

Supplementary European Search Report for PCT/IB2009051717 dated Nov. 9, 2012.

(Continued)

*Primary Examiner* — Jacob K Ackun
(74) *Attorney, Agent, or Firm* — Sughrue Mion, PLLC

(57) ABSTRACT

Interchangeable packing apparatus (4) for aerogenerator blades (1) particularly versatile for different blade sizes and designs, and to meet the different legal requirements of various countries, but still having a low manufacturing cost and high capacity of supporting the heavy loads. The packing apparatus (4) comprises an external frame (9) and an internal frame (8) wherein the internal frame (8) comprises an structural mounting and at least damper member (10) for receiving one side of at least a portion of the aerogenerator blade (1) and wherein said internal frame (8) substantially supports the load of at least said portion of the aerogenerator blade (1) and wherein the internal frame (8) is selectively positionable relative to the external frame in at least two positions in order to receive different portions of the aerogenerator blade (1) relative to the longitudinal axis. Moreover, the packing apparatus also comprises at least one anchor arm (14) pivotally coupled to the external frame (9) and selectively positionable.

2 Claims, 3 Drawing Sheets

(56) References Cited

U.S. PATENT DOCUMENTS

| | | |
|---|---|---|
| 2003/0175089 A1 | 9/2003 | Almind |
| 2004/0091346 A1 | 5/2004 | Wobben |
| 2004/0217037 A1 | 11/2004 | O'Kane et al. |
| 2005/0031431 A1 | 2/2005 | Wobben |
| 2005/0180833 A1 | 8/2005 | Almind |
| 2005/0258064 A1 | 11/2005 | Wobben |
| 2006/0251517 A1 | 11/2006 | Grabau |
| 2007/0177954 A1* | 8/2007 | Kootstra et al. ............ 410/44 |
| 2007/0189895 A1* | 8/2007 | Kootstra et al. ............. 416/9 |
| 2007/0199847 A1 | 8/2007 | Llorente Gonzalez et al. |
| 2007/0248431 A1 | 10/2007 | Jensen |
| 2007/0258823 A1 | 11/2007 | Haarh et al. |
| 2008/0296197 A1 | 12/2008 | Kootstra |
| 2009/0003957 A1 | 1/2009 | Llorente Gonzalez |
| 2009/0020445 A1 | 1/2009 | Koike |
| 2010/0310379 A1* | 12/2010 | Livingston ............ 416/229 R |

FOREIGN PATENT DOCUMENTS

| | | |
|---|---|---|
| EP | 1956234 A2 | 8/2008 |
| GB | 2 177 375 A | 1/1987 |
| WO | 03076307 A1 | 9/2003 |
| WO | 2008/004195 A2 | 1/2008 |
| WO | 2010/070388 A1 | 6/2010 |

OTHER PUBLICATIONS

Ditlev Engel, "The Transport Game", VestasGlobal, Apr. 2006, p. 12-17, No. 05, Year 3, Vestas Wind Systems A/S. www.vestas.com.

* cited by examiner

INTERCHANGEABLE PACKING APPARATUS FOR AEROGENERATOR BLADES

TECHNICAL FIELD

This invention relates to containers, fixtures and packing elements or apparatus specially adapted for special articles or materials, more specifically to elements of large size such as wind rotor blades.

BACKGROUND ART

Blades for wind power generators (hereinafter referred to as 'aerogenerator blades' or simply 'blades') with significantly large dimensions such as the length (considering the longitudinal axis) longer than 45 m, and width (considering the maximum chord line) longer than 3 m are already manufactured in large numbers. However, the locations where the blades will be installed generally require them to be transported from the factory by different means of transport, such as highway, railway, sea or other means.

The transportation may be limited due to various restrictions such as: height of viaducts, tunnels, bridges, and other obstacles with limited height; accentuated curves; ship cargo space, among others. In addition to the problems occurring due to the transportation per se, there are blade loading and unloading operational difficulties, since every time it is necessary to change the transportation means—for example, from a truck to a train, or from a truck to a ship, and vice versa—a different type of packing apparatus is required. Furthermore, there are some legal transport restrictions that may vary from country to country, such as the size of the portion of the blade that can be longer than the vehicle that is transporting the blade.

DISCLOSURE OF INVENTION

Technical Problem

Although there are many apparatuses and containers described in the prior art for transporting aerogenerator blades, these apparatuses and containers have several disadvantages. Particularly, there is still a need for a package which is versatile in order to accommodate different blade sizes and designs, as well as meet the different legal requirements of various countries, but still having a low manufacturing cost and high capacity of supporting the heavy loads of the large blades.

Technical Solution

To overcome the drawbacks and problems described above and other disadvantages not mentioned herein, in accordance with the purposes of the invention, as described herein, one basic aspect of the present invention is directed to a packing apparatus for aerogenerator blades characterized by comprising an external frame and an internal frame. The internal frame comprises an structural mounting and at least one damper member for receiving one side of at least a portion of the aerogenerator blade and wherein said internal frame substantially supports the load of at least said portion of the aerogenerator blade, and wherein the internal frame is selectively positionable relative to the external frame in at least two positions in order to receive different portions of the aerogenerator blade relative to its longitudinal axis. The packing apparatus also comprises at least one anchor arm pivotally coupled to the external frame and selectively positionable relative to said external frame in at least two positions, said positions being a locked position in which the end of the anchor arm locks the other side of said portion of the aerogenerator blade against the internal frame damper member, providing stability to at least this portion of the aerogenerator blade in the handling or transportation thereof, and an open position for allowing loading and unloading of the aerogenerator blade to and from the packing apparatus.

Advantageous Effects

The present invention has several advantages over the prior art. By using an external frame in combination with an independent internal frame and an anchor arm, it is possible to build a standardized external frame with similar size and design of a common container used for road, railway of ship transport for many blade sizes or designs, while the internal frame is customized for the different shapes of different blade designs and the pivotal anchor arm provides the needed stability. Hence, the production costs can be lower. Moreover, it is particularly advantageous the fact that the same internal frame may be positioned in at least two different positions within the external frame, allowing the transport of the blade in different positions relative to its longitudinal axis. Therefore, with this feature it is possible to change the position of supporting the blade due to a change in the transportation means or due a change in a legal requirement, for instance, how much of the blade body is allowed to hang off the truck.

DESCRIPTION OF DRAWINGS

The accompanying drawings are not necessarily drawn on scale. In the drawings, some identical or nearly identical components that are illustrated in various figures may be represented by a corresponding numeral. For purposes of clarity, not every component may be labelled in every drawing.

MODE FOR INVENTION

Figure 1:
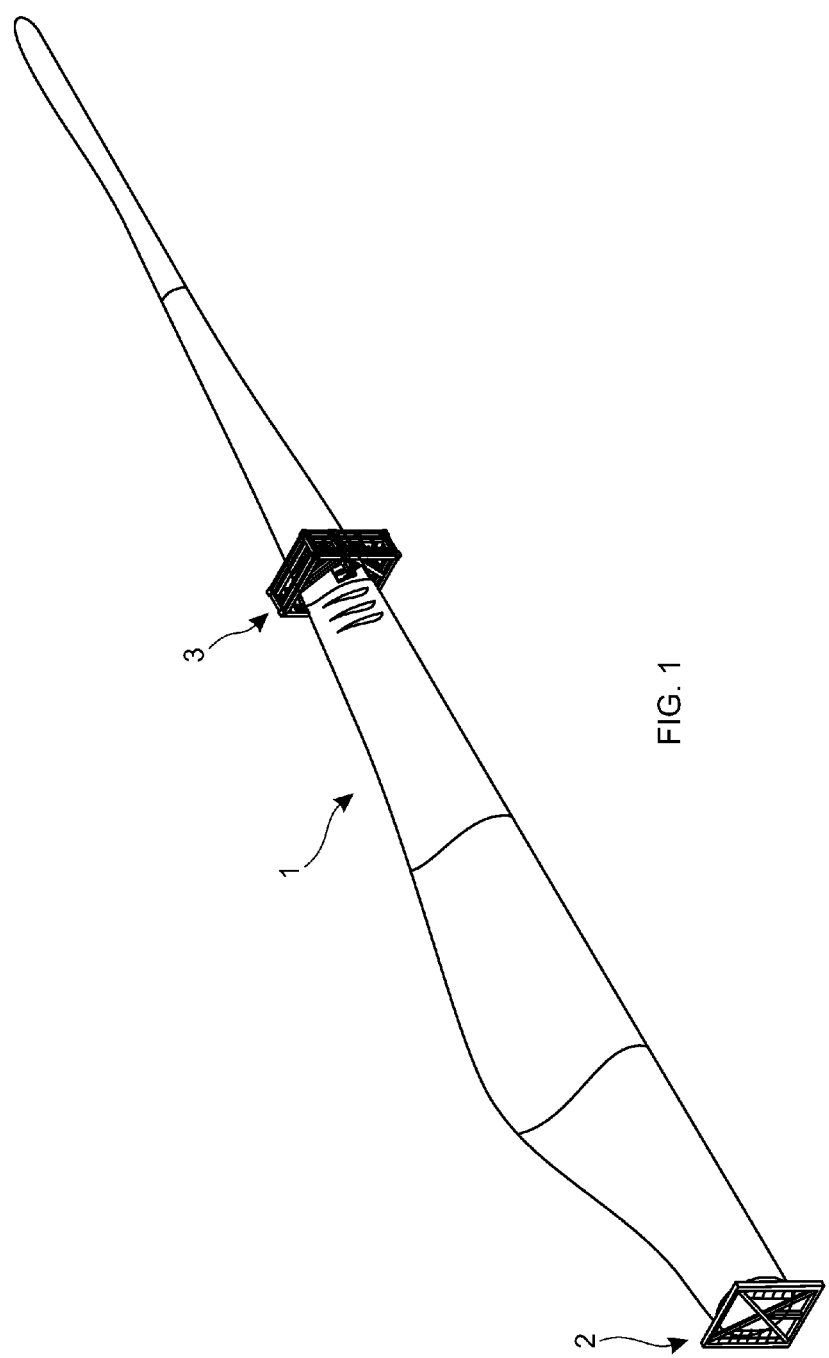
FIG. 1 illustrates one exemplary aerogenerator blade including a common fixture element at the root and an exemplary packing apparatus according to the invention positioned approximately in the middle of the blade.

This invention is not limited in its application to the details of construction and the arrangement of components set forth in the following description or illustrated in the drawings. The invention is capable of other embodiments and of being practiced or carried out in various ways. Also, the phraseology and terminology used herein is for the purpose of description and should not be regarded as limiting. The use of 'including', 'comprising', or 'having', 'containing', 'involving', and variations thereof herein, is meant to encompass the items listed thereafter and equivalents thereof as well as additional items.

FIG. 1 illustrates one exemplary typical aerogenerator blade (1) including a conventional fixture element (2) at the root and an exemplary packing apparatus (3) according to the invention positioned approximately in the middle of the blade in relation to its longitudinal axis.

Figure 2:
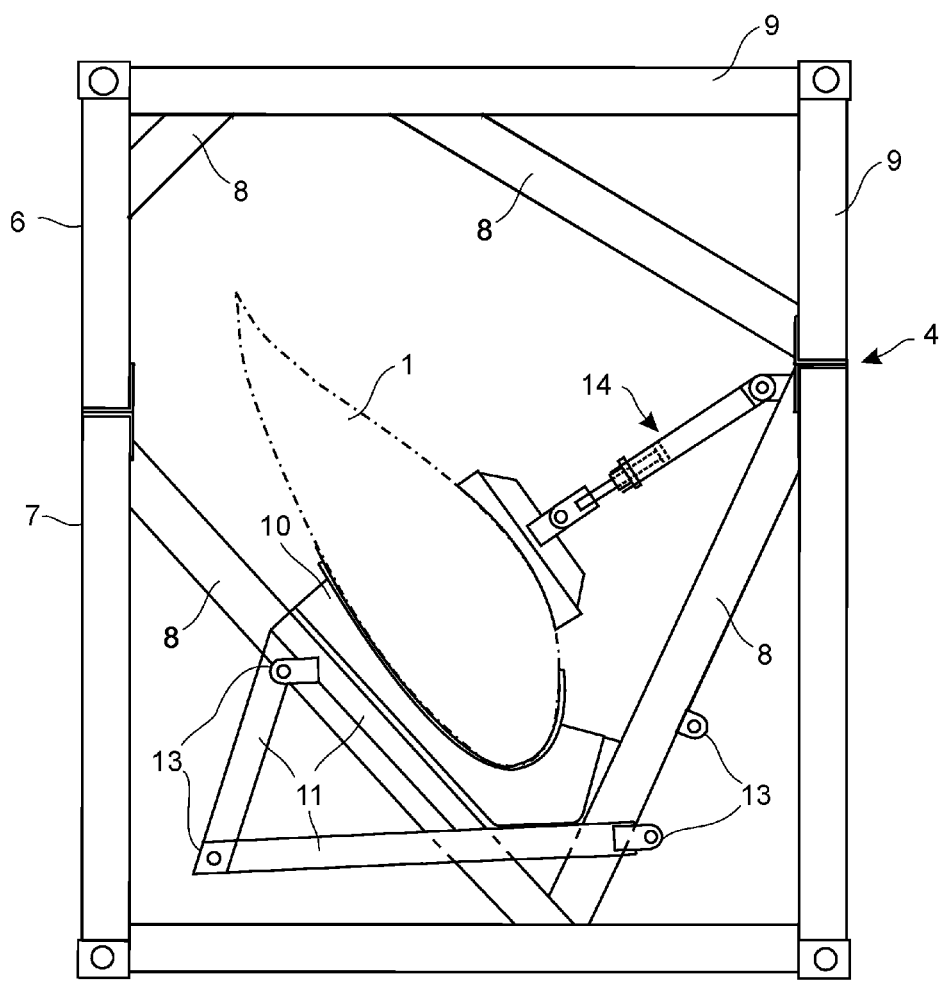
FIG. 2 illustrates a front view of a packing apparatus according to the invention in a first position.
Figure 3:
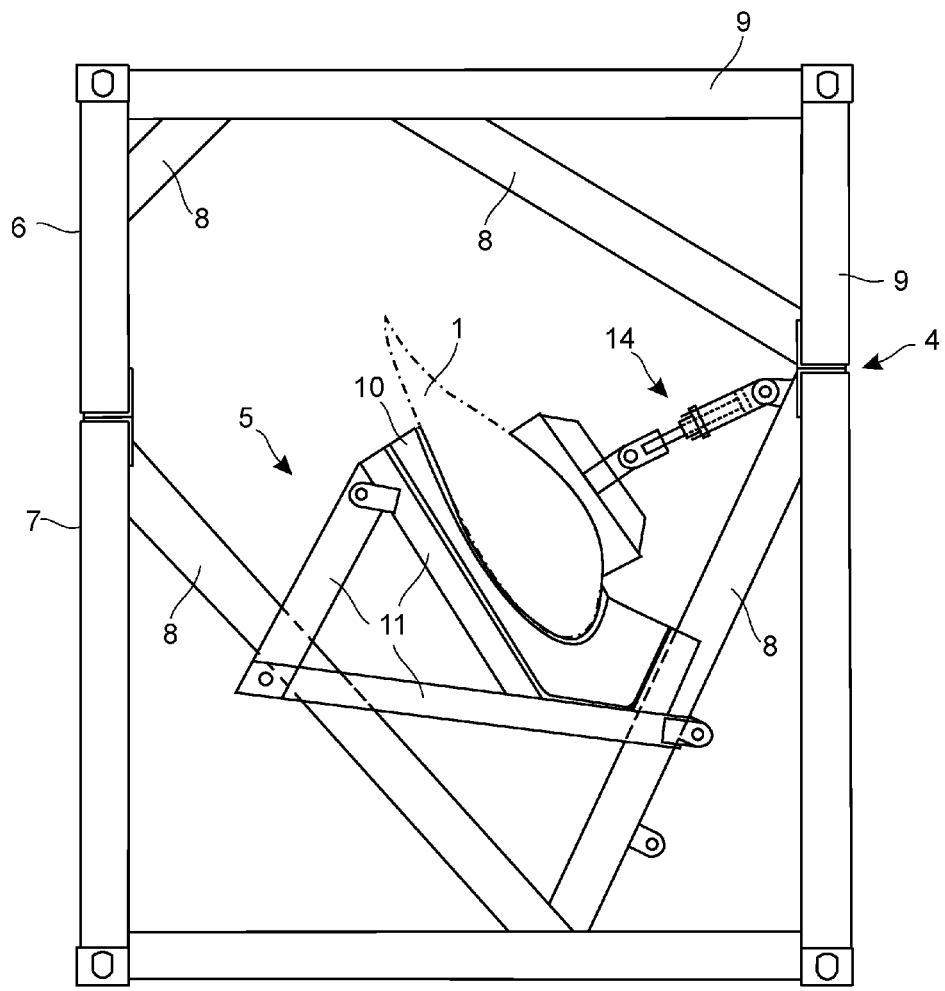
FIG. 3 illustrates a front view of a packing apparatus according to the invention in a second position.

FIGS. 2 and 3 illustrate a front view of a packing apparatus (3) according to the invention in a first position and in a second position respectively.

The packing apparatus (3) for the aerogenerator blade (1) comprises an external frame (4) and an internal frame (5). In the exemplary embodiment shown in FIGS. 02 and 03, the external frame (4) comprises an upper (6) and a lower (7) part that can be coupled together by connecting devices, such as twist-locks and screws, among others. The upper (6) and lower (7) parts can also have diagonal members (8) or beams, columns/legs (9) for providing additional structural strength and receiving the internal frame (5). The internal frame (5) can be connected to the diagonal members (8) or alternatively directly to the legs/columns (9) of the external frame (4). The connection may be in any suitable manner, including welded attachments, clamping attachments, bolt and nuts attachments, among others.

The internal frame (5) comprises a structural mounting (11) with a set of diagonal members, beams, legs/columns and at least one damper member (10) for receiving one side of at least a portion of the aerogenerator blade (1). The damper member (10) absorbs the pressure of the load of the aerogenerator blade (1) without causing harm thereto; while the structural mounting (11) provides a selectively positionable connection relative to the external frame (4). In the exemplary embodiment shown in FIGS. 2 and 3, the structural mounting (11) and the diagonal members (8) of the external frame (4) have a plurality of connection members (13) to provide the connection between the internal frame (5) and the external frame (6) in at least two positions. Additionally, as shown in FIGS. 2 and 3, the beans of the structural mounting (11) may be Connected by the plurity of connection members (13) to form a triangular shape.

The diagonal members, beams, legs/columns of the internal frame (5) structural mounting (11) and of the external frame (4) may be of any suitable material, such as metallic members with a channel section, a tubular section, an 'H' or 'L' section, among others.

Therefore, the internal frame (5) substantially supports the load of at least a portion of the aerogenerator blade (1) and is able to receive different portions of the aerogenerator blade (1) relative to its longitudinal axis, as shown in a first position closer to the root in FIG. 2 and in a second position closer to tip of the blade in FIG. 3.

Furthermore, the external frame (4) comprises an anchor arm (14) pivotally coupled to the external frame (4) and selectively positionable relative to said external frame (4) in at least two positions. FIGS. 2 and 3 show a locked position in which the end of the anchor arm (14) locks the other side of the portion of the aerogenerator blade (1) against the internal frame (5) damper member (10), providing stability to at least this portion of the aerogenerator blade (1) for handling or transportation thereof. The anchor arm (14) may be positioned at least in one open position (not shown) for allowing loading and unloading of the aerogenerator blade (1) to and from the packing apparatus. The anchor arm (14) can also include a damper element as shown in FIGS. 2 and 3 in order to securely lock the blade (1) without causing harm thereto; however, other means for avoiding harm to the blade (1) may be used.

While the invention has been disclosed by this specification, including its accompanying drawings and examples, various equivalents, modifications and improvements will be apparent to the person skilled in the art. Such equivalents, modifications and improvements are also intended to be encompassed by the following claims.

The invention claimed is:

1. Interchangeable packing apparatus for aerogenerator blades, the packing apparatus comprising:
   an external frame;
   an internal frame comprising:
      a structural mounting which is selectively positionable in at least two positions relative to the external frame, wherein the structural mounting comprises three beams attached to each other in a triangular configuration and attached to the external frame in at least two locations in each of the at least two positions; and
      at least one damper member attached to the structural mounting, wherein the at least one damper member is configured to contact and support a portion of an aerogenerator blade; and
   at least one anchor arm pivotally coupled to the external frame and selectively positionable relative to the external frame in at least a locked position, in which an end of the anchor arm contacts the aerogenerator blade and supports the aerogenerator blade against the at least one damper member, and an open position in which a location of the anchor arm permits loading and unloading of the aerogenerator blade to and from the packing apparatus.

2. Interchangeable packing apparatus for aerogenerator blades, the packing apparatus comprising:
   an external frame;
   an internal frame comprising:
      a structural mounting which is selectively positionable in at least two positions relative to the external frame, wherein the structural mounting comprises a plurality of beams attached to each other in a polygonal configuration and attached to the external frame in at least two locations in each of the at least two positions; and
      at least one damper member attached to the structural mounting, wherein the at least one damper member is configured to contact and support a portion of an aerogenerator blade; and
   at least one anchor arm pivotally coupled to the external frame and selectively positionable relative to the external frame in at least a locked position, in which an end of the anchor arm contacts the aerogenerator blade and supports the aerogenerator blade against the at least one damper member, and an open position in which a location of the anchor arm permits loading and unloading of the aerogenerator blade to and from the packing apparatus.

* * * * *